United States Patent
Katz et al.

(10) Patent No.: US 8,023,931 B2
(45) Date of Patent: Sep. 20, 2011

(54) CALL REROUTING

(75) Inventors: Darius Katz, Malmo (SE); William O. Camp, Jr., Chapel Hill, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 1131 days.

(21) Appl. No.: 11/679,354

(22) Filed: Feb. 27, 2007

(65) Prior Publication Data
US 2008/0205414 A1  Aug. 28, 2008

(51) Int. Cl.
*H04M 3/42* (2006.01)
(52) U.S. Cl. .............. 455/417; 455/428; 455/432.2; 455/445; 455/41.2; 370/351; 370/355; 370/356; 370/357; 370/395.31
(58) Field of Classification Search ........... 455/445, 455/412.1–417, 550.1, 517, 569.1, 428, 432.2, 455/41.2, 351; 370/351, 355, 356, 357, 395.31, 370/395.32, 395.52, 395.54
See application file for complete search history.

(56) References Cited

U.S. PATENT DOCUMENTS

| | | | | |
|---|---|---|---|---|
| 5,222,123 | A * | 6/1993 | Brown et al. | 455/417 |
| 7,363,006 | B2 * | 4/2008 | Mooney | 455/41.3 |
| 7,693,511 | B2 * | 4/2010 | Bottrich et al. | 455/417 |
| 7,751,546 | B2 * | 7/2010 | Poustchi et al. | 379/211.02 |
| 7,778,601 | B2 * | 8/2010 | Seshadri et al. | 455/41.2 |
| 2002/0068600 | A1 * | 6/2002 | Chihara et al. | 455/550 |
| 2002/0132582 | A1 | 9/2002 | Mooney | |
| 2003/0022660 | A1 * | 1/2003 | Payne et al. | 455/417 |
| 2006/0148420 | A1 | 7/2006 | Wonak et al. | |
| 2007/0032225 | A1 * | 2/2007 | Konicek et al. | 455/417 |
| 2008/0244148 | A1 * | 10/2008 | Nix et al. | 710/313 |
| 2010/0124904 | A1 * | 5/2010 | Forte | 455/411 |

OTHER PUBLICATIONS

International Preliminary Report on Patentability for International Application No. PCT/IB2007/002426 dated Mar. 31, 2009.
Written Opinion for International Application No. PCT/IB2007/002426 dated Feb. 20, 2008.
Worley, "Call Pickup Examples in SIP", IETF Standard-Working-Draft, Internet Engineering Task Force, IETF, Ch. No. 2, Jun. 2006, pp. 5-9.
Mahy, Plantronics C Jennings Cisco Systems, Remote Call Control in the Session Initiation Protocol (SIP) using the REFER method and the session-oriented dialog package; IETF Standard-Working-Draft, Internet Engineering Task Force, IETF., Ch. No. 3, Mar. 2006, pp. 4-5.

* cited by examiner

*Primary Examiner* — Patrick Edouard
*Assistant Examiner* — Fred Casca
(74) *Attorney, Agent, or Firm* — Renner, Otto, Boisselle & Sklar, LLP

(57) ABSTRACT

A device and method for rerouting a communication from a first communication device to a second communication device includes a rerouting circuit. The rerouting circuit is operative to reroute a communication intended for the first communication device to the second communication device. Rerouting of the communication may be initiated by sending a rerouting request from the device not intended to receive the communication.

18 Claims, 5 Drawing Sheets

CALL REROUTING

TECHNICAL FIELD OF THE INVENTION

The present invention relates generally to electronic equipment, such as electronic equipment for engaging in voice communications. More particularly, the invention relates to a device and method for rerouting communications between communication devices, such as electronic equipment.

DESCRIPTION OF THE RELATED ART

Mobile and/or wireless items of electronic equipment are becoming increasingly popular. For example, mobile telephones are now in wide-spread use. In addition, the features associated with certain types of electronic equipment have become increasingly diverse. To name a few examples, many electronic equipment include cameras, text messaging capability, Internet browsing functionality, electronic mail capability, video playback capability, audio playback capability, image display capability, navigation capability, and hands-free headset interfaces.

It is common today for individuals to have multiple telephones (both mobile and wire line). For example, an individual may have a personal mobile telephone and a work mobile telephone, both of which may be carried by the individual at the same time. When a communication is received on one of the mobile telephones, the individual must pick up that mobile telephone to answer the communication. As will be appreciated, it can be cumbersome to carry multiple mobile telephones at the same time.

Similarly, an individual may have both a wire line telephone and a mobile telephone (e.g., a wire line telephone in the home and a mobile telephone for outside the home). While it is typical to carry a mobile telephone on one's person, the same is not necessarily true for wire line telephones. Thus, when receiving a communication on a wire line telephone, the individual typically walks to the wire line telephone to answer and/or receive the communication. As is often the case, the individual may not be near the wire line telephone when the communication is incoming (e.g., the individual may be in a different room or on a different level than that of the wire line telephone). Although not as common, the same is true for mobile telephones. That is, an individual may not be near his mobile telephone as a call is incoming.

SUMMARY

A drawback to conventional wire line and mobile telephone systems is that when a communication is received on a particular telephone, and that particular telephone is not presently near the individual, then the individual must find the telephone to receive the communication. In some instances, the time required for the individual to move and find the telephone may result in missing the communication altogether.

When dealing with mobile telephones, the issue is not necessarily finding the mobile telephone, but the fact that each mobile telephone must be carried in a location that can be easily accessed (e.g., in one's pocket, on a belt clip, etc.). As will be appreciated, carrying multiple mobile telephones can be an inconvenience. For example, there may be insufficient pocket space to carry multiple mobile telephones, placing multiple mobile telephones in a pocket can be uncomfortable, and/or carrying multiple telephones on a belt clip may be cumbersome.

The present invention provides a method and apparatus for rerouting communications between communication devices, including electronic equipment, wire line phones (conventional and VoIP), etc. For example, if an individual has both a wire line telephone and a mobile telephone, and a communication is received on the wire line telephone (which may be in a different location than the individual's present location), the communication intended for the wire line telephone may be rerouted to the mobile telephone. Rerouting may be performed, for example, via a mobile telephone switching network, a wire line switching network, a VoIP server, a PC coupled to a VoIP telephone, the electronic equipment itself, etc., wherein a rerouting request is transmitted to a rerouting circuit, which proceeds to reroute the communication.

When using multiple electronic equipment (e.g., two mobile telephones such as a personal telephone and a work telephone), one of the mobile telephones (e.g., the personal telephone) may be stored in a convenient location (e.g., on a belt clip or pocket), while the other mobile telephone (e.g., the work telephone) may be carried nearby, but not necessarily in a convenient location (e.g., within a bag, purse, etc.). Then, if a communication is received on the work mobile telephone, the individual can use the personal mobile telephone, which may be easily accessed, to instruct the work mobile telephone to send the communication to the personal mobile telephone. The communication may be sent from the work mobile telephone to the personal mobile telephone using a wireless connection, e.g., a WiFi connection such as Bluetooth or the like, wherein the communications may be streamed between the mobile telephones. Alternatively, a reroute request may be processed using the mobile telephone switching network. As a result, a single, easily accessible telephone can be used to answer communications directed to either telephone.

In addition to voice communications, other forms of communication also may be rerouted. For example, email, text messages, music, videos, etc. may be rerouted between communication devices.

According to one aspect of the invention, a method for rerouting a communication from a first communication device to a second communication device includes: upon receiving the communication at the first communication device, the second communication device requesting to a rerouting circuit that the communication intended for the first communication device be rerouted to the second communication device; and rerouting the communication intended for the first communication device to the second communication device.

According to another aspect of the invention, the rerouting circuit can be implemented in at least one of the first or second communication device, or in a network server that provides communications to the first and/or second communication device, said rerouting circuit operative to coordinate communications to the first and second communication devices.

According to another aspect of the invention, using the second communication device to send the request includes using at least one of a WiFi connection, a PSTN connection, a mobile telephone network connection, or a VoIP connection as the medium for sending the request.

According to another aspect of the invention, using a WiFi connection further includes using a computer that is communicatively coupled to the first and/or second communication device via the WiFi connection.

According to another aspect of the invention, the first communication device is a VoIP telephone communicatively coupled to the computer, the method further includes using the computer to establish communications with a VoIP server so as to provide VoIP communications.

According to another aspect of the invention, the method further includes establishing a direct communication link between the first and second communication devices, and using the direct communication link to reroute the communication intended for the first communication device to the second communication device.

According to another aspect of the invention, establishing a direct communication link includes communicating events between the first and second communication devices.

According to another aspect of the invention, the events include at least one of notification of an incoming communication or notification of a missed communication.

According to another aspect of the invention, establishing a direct communication link includes establishing a direct communication link via a WiFi connection.

According to another aspect of the invention, rerouting the communication intended for the first communication device to the second communication device includes streaming the communication between the first and second communication devices.

According to another aspect of the invention, the communication is at least one of a voice communication, a text message or an email.

According to another aspect of the invention, the first communication device is a mobile telephone, and the second communication device is a mobile telephone or a wire line telephone.

According to another aspect of the invention, the first and second communication devices are electronic equipment.

According to another aspect of the invention, a method for rerouting a communication from a first communication device to a second communication device includes: upon receiving the communication at the first communication device, the first communication device, via a short range communication link, automatically notifying the second communication device of the received communication; and rerouting the communication intended for the first communication device to the second communication device when the notification is acknowledged on the second communication device.

According to another aspect of the invention, rerouting includes streaming the communication from the first communication device to the second communication device via the short range communication link.

According to another aspect of the invention, the method further includes streaming a second communication from the second communication device to the first communication device via the short range communication link.

According to another aspect of the invention, acknowledging includes transmitting a request from the second communication device to the first communication device to receive the communication intended for the first communication device.

According to another aspect of the invention, an electronic equipment operative to establish communications with a communication device includes: call circuitry to establish a call over a communications network; and a rerouting circuit operatively coupled to the call circuitry, said rerouting circuit operative to reroute via the call circuitry a first communication intended for the electronic equipment to the communication device.

According to another aspect of the invention, the electronic equipment further includes a short range wireless communication interface, wherein the rerouting circuit is further operative to reroute via the short range wireless communication interface the first communication intended for the electronic equipment to the communication device.

According to another aspect of the invention, the rerouting circuit is operative to stream the first communication to the communication device via the short range wireless communication interface.

According to another aspect of the invention, the rerouting circuit is further operative to receive a second communication intended for the communication device, said second communication being rerouted to the electronic equipment.

According to another aspect of the invention, the rerouting circuit is operative to notify the communication device of events.

According to another aspect of the invention, the events include notification of an incoming communication and/or notification of a missed communication.

According to another aspect of the invention, the electronic equipment is a mobile telephone.

According to another aspect of the invention, the rerouting circuit is operative to automatically notify the communication device of the communication.

To the accomplishment of the foregoing and the related ends, the invention, then, comprises the features hereinafter fully described in the specification and particularly pointed out in the claims, the following description and the annexed drawings setting forth in detail certain illustrative embodiments of the invention, these being indicative, however, of but several of the various ways in which the principles of the invention may be suitably employed.

Other systems, methods, features, and advantages of the invention will be or become apparent to one with skill in the art upon examination of the following drawings and detailed description. It is intended that all such additional systems, methods, features, and advantages be included within this description, be within the scope of the present invention, and be protected by the accompanying claims.

Although the invention is shown and described with respect to one or more embodiments, it is to be understood that equivalents and modifications will occur to others skilled in the art upon the reading and understanding of the specification. The present invention includes all such equivalents and modifications, and is limited only by the scope of the claims.

Also, although the various features are described and are illustrated in respective drawings/embodiments, it will be appreciated that features of a given drawing or embodiment may be used in one or more other drawings or embodiments of the invention.

It should be emphasized that the term "comprise/comprising" when used in this specification is taken to specify the presence of stated features, integers, steps or components but does not preclude the presence or addition of one or more other features, integers, steps, components or groups thereof.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Likewise, elements and features depicted in one drawing may be combined with elements and features depicted in additional drawings. Moreover, in the drawings, like reference numerals designate corresponding parts throughout the several views.

DETAILED DESCRIPTION OF EMBODIMENTS

Figure 1:
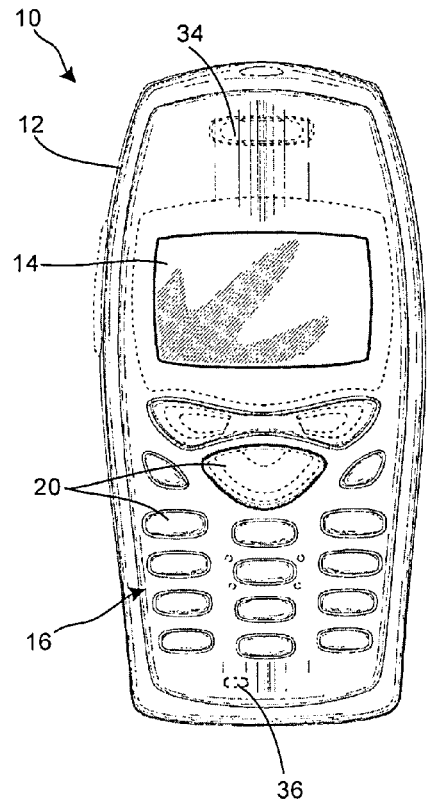
FIG. 1 is a schematic view of a mobile telephone as an exemplary electronic equipment in accordance with an embodiment of the present invention.

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like. The term "communication device" includes electronic equipment, as well as telephones, such as VoIP based wire line telephones and conventional wire line telephones. The term "communication" includes voice communications (both live and pre-recorded), text messages, and email messages (including attachments such as music and videos).

In the present application, the invention is described primarily in the context of a mobile telephone. However, it will be appreciated that the invention is not intended to be limited to a mobile telephone and can be any type of communication device. The present invention will now be described with reference to the drawings, wherein like reference numerals are used to refer to like elements throughout.

Referring initially to FIG. 1, an electronic equipment 10 is shown in accordance with the present invention. The electronic equipment includes a communication rerouting function that is configured to reroute incoming communications (voice, email, text, etc.) to other communication devices, and to receive rerouted communications from other communication devices. The communication rerouting function enables a user to receive calls, messages, data, etc. intended for other communication devices when the other communication devices are not readily accessible. It will be appreciated that the communication rerouting function may be embodied as executable code that may be resident in and executed by the electronic equipment 10.

The electronic equipment in the exemplary embodiment is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized without departing from the scope of the invention.

The mobile telephone 10 includes a display 14 and keypad 16. As is conventional, the display 14 displays information to a user such as operating state, time, telephone numbers, contact information, various navigational menus, etc., which enable the user to utilize the various features of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or land line/wire line telephone. However, the called/calling device need not be another telephone, but may be some other device such as an Internet web server, content providing server, etc.

Figure 2:
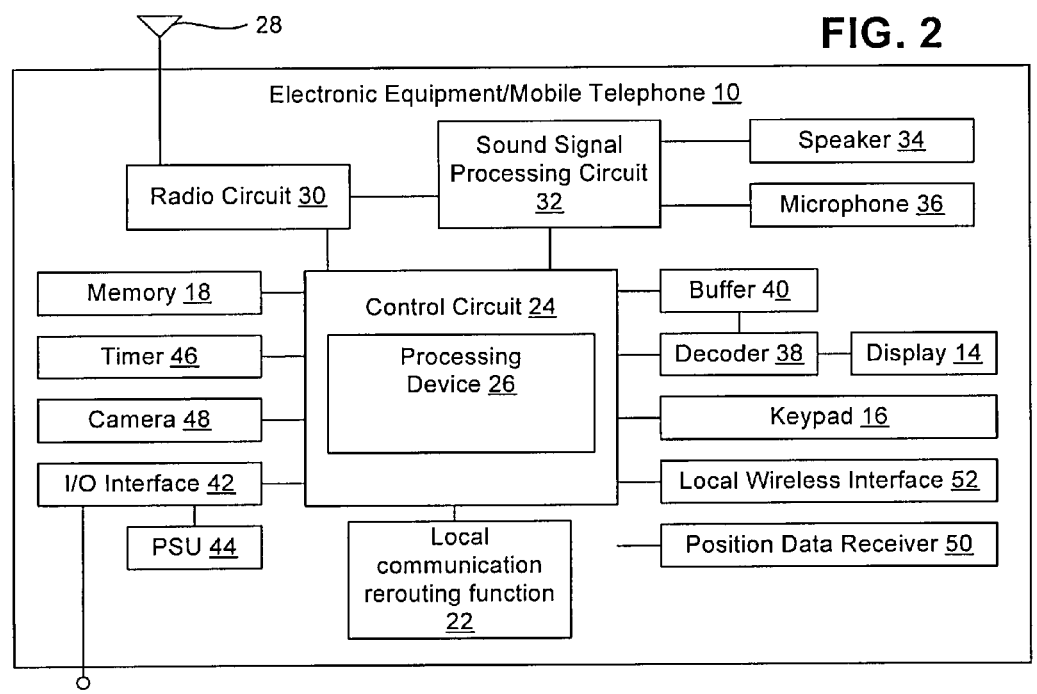
FIG. 2 is a schematic block diagram of the relevant portions of the mobile telephone of FIG. 1 in accordance with an embodiment of the present invention.

FIG. 2 represents a functional block diagram of the mobile telephone 10. With the exception of a communication rerouting function 22, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform the communication rerouting function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the communication rerouting function 22 is executed by the processing device 26 in accordance with the preferred embodiment of the invention, such functionality could also be carried out via dedicated hardware, firmware, software, or combinations thereof, without departing from the scope of the invention. Any of these implementations may be referred to as a communication rerouting circuit.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive audiovisual content. For example, the receiver may be an IP datacast compatible receiver compatible with a hybrid network structure providing mobile communications and DVB-H based or similar services. Other receivers for interaction with a mobile radio network or broadcasting network are possible and include, for example, GSM, CDMA, WCDMA, MBMS, WiFi, WiMax, DVB-H, ISDB-T, etc.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18 or derived from an incoming video data stream received by the radio circuit 30. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown). Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, hands-free adaptor, another mobile radio terminal, computer or other device.

The mobile telephone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video and so forth. Processing such data may include storing the data in the memory 18, executing applications to allow user interaction with data, displaying video and/or image content associated with the data, broadcasting audio sounds associated with the data and so forth.

Figure 3:
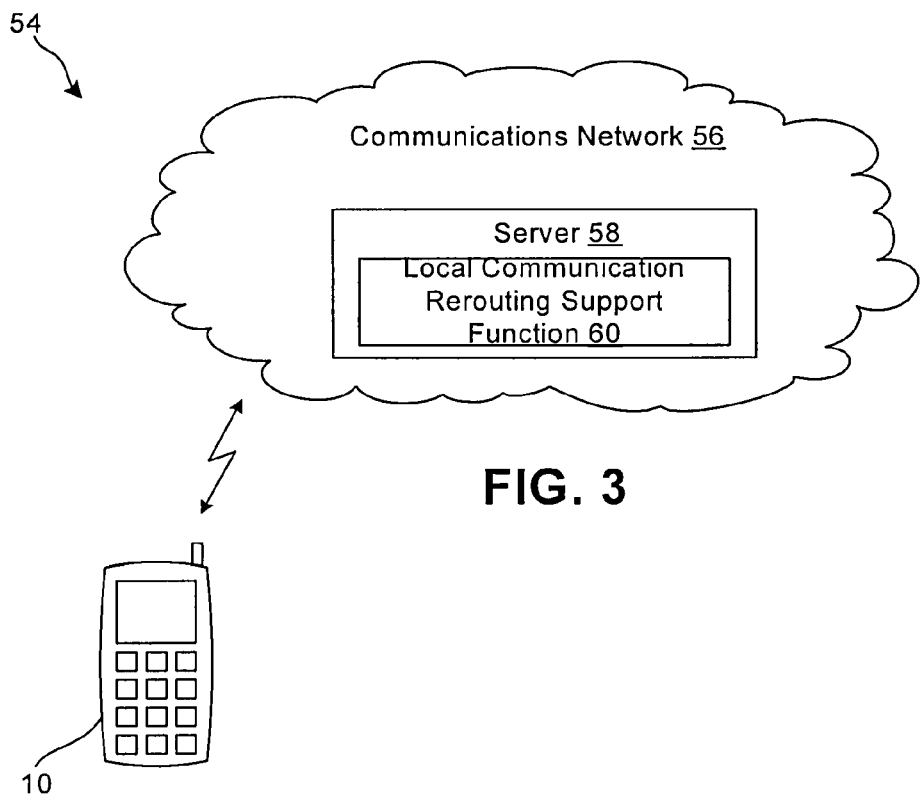
FIG. 3 is a schematic diagram of an exemplary communications system in which the mobile telephone of FIG. 1 may operate.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 56 may support the communications activity of multiple mobile telephones 10, although only one mobile telephone 10 is shown in the illustration of FIG. 3.

In one embodiment, the server 58 may operate in stand alone configuration relative to other servers of the network 52 or may be configured to carry out multiple communications network 58 functions. As will be appreciated, the server 58 may be configured as a typical computer system used to carry out server functions and may include a processor configured to execute software containing logical instructions that embody the functions of the server 58. Those functions may include functions that are complimentary to the operation of the communication rerouting function 22 of the mobile telephone 10, and will be collectively referred to as a communication rerouting support function 60.

Moving now to FIGS. 4-7, several exemplary implementations of communication devices and/or systems implementing a communication rerouting function in accordance with the invention are shown. Beginning with FIG. 4, a first communication device 70 (e.g., a wire line telephone) is communicatively coupled to computer 72 (e.g., a home computer coupled to the internet for providing VoIP communications capability). The computer 72 may be used to communicate with a VoIP based server 74 so as to provide VoIP communications as is conventional. A second communication device 76 (e.g., electronic equipment embodied as a mobile telephone) is communicatively coupled to the computer 72 via a wireless connection 78 (e.g., a WiFi connection or a Bluetooth connection or other short range communication connection). In normal operation, communications from the VoIP server 74 are routed to a communication device based on an IP address associated with the communication device. For example, communications intended for the first communication device 70, based on the IP address, are transmitted from the VoIP server 74 to the computer 72. The computer 72 then routes the communications to the first communication device 70 using conventional techniques.

If an individual is made aware that a communication is being directed to the first communication device 70 (e.g., the individual hears the first communication device ringing) and he wishes to receive the communications intended for the first communication device 70 via the second communication device 76, then the individual can initiate a rerouting request. This may be accomplished, for example, by pressing a function key or the like on the second communication device 76, wherein activation of the function key represents a request to reroute a communication. This request or command, which may be encapsulated as a SIP script or the like, for example, then can be transmitted via the WiFi connection 78 to the computer 72. The SIP script then can be executed by the computer 72 to implement the rerouting request. More specifically, the SIP script instructs the computer 72 to answer the wire line call and, internal to the computer 72, reroute the call to the second communication device 76 via the WiFi connection 78, for example. Further, in rerouting the communication, transcoding (e.g., using a different CODEC) may or may not be implemented in the computer 72 depending one or more factors relating to the first and/or second communication devices 70 and 76.

The rerouting process may be implemented by using the computer 72 as a bridge. For example, the incoming communication may be provided on a first port (e.g., a modem, broadband port, etc.—not shown) of the first computer 72. The first communication device 70 may be communicatively coupled internally within the computer 72 to a second port (e.g., a serial port or a USB port—not shown), communicating with the WiFi short range communications device. Then, to reroute the communication, the computer 72 can send data packets from the first port to the second port, and vice versa.

Alternatively, the computer 72 may issue a new routing table extension (e.g., provide a new IP address to the incoming communication, such as the IP address of the second communication device 76). As a result, the communication, instead of terminating at the first communication device 70, will continue routing to the new IP address (i.e., the second communication device 76 in this example) using, for example, the internet. In other words, the computer 72 simply provides a new destination IP address, and reroutes the communication via the internet (or via WiFi) to the new destination.

Further, as an incoming communication for the first communication device 70 is detected by the computer 72, the computer 72 may transmit a signal or the like to the second communication device 76 (e.g., a SIP encapsulated script via the WiFi connection 78). This signal then can be used by the second communication device 76 to alert the individual of an incoming communication intended for the first communication device 70 (e.g., by ringing or other audible or visual means). Additionally, the type of alert or the sound of the alert produced on the second communication device 76 may be based on the intended receiver of the communication (e.g., a first ring tone may be provided for communications intended for the first communication device 70, and a second, different ring tone may be provided for communications intended for the second communication device 76). The user then can have the call rerouted to the second communication device 76 by initiating a reroute request as described above. Providing notification at the second communication device 76 of an incoming communication for the first communication device 70 is advantageous, particularly if the individual cannot hear or otherwise be notified of the incoming communication on the first communication device 70 (e.g., he cannot hear the wire line telephone ringing). Accordingly, in the example of FIG. 4, the communication rerouting function is primarily implemented in the computer 72.

While the above example describes how communications may be rerouted from the first communications device 70 to the second communication device 76, it will be appreciated that the opposite is possible. That is, calls directed to the second communication device 76 may be rerouted to the first communication device 70. This is true for all of the examples presented herein, but for sake of brevity, only the following example is provided.

Figure 4:
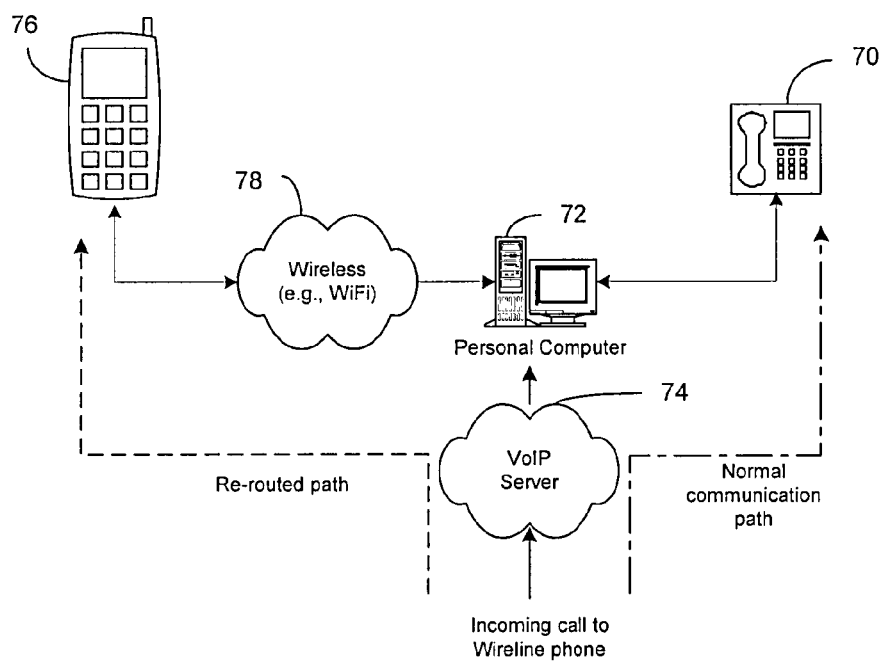
FIG. 4 is a schematic diagram illustrating an exemplary communication rerouting operation in accordance with the invention.

For example, in FIG. 4, the second communication device 76 may be receiving a VoIP communications via computer 72 and WiFi connection 78. An individual hears the second communication device ringing, but is a considerable distance from the second communication device 76 (e.g., on a different floor of a house). However, the individual may be near the first communication device 70 (i.e., the VoIP based wire line phone). In this case, the individual may pick up the first communication device 70 and send a rerouting request in a manner described above (e.g., via a function key or the like). The rerouting request is received by the computer 72, which then intercepts the VoIP call intended for the second communication device 76 and reroutes it to the first communication device 70 in a manner similar to that discussed above.

Figure 5:
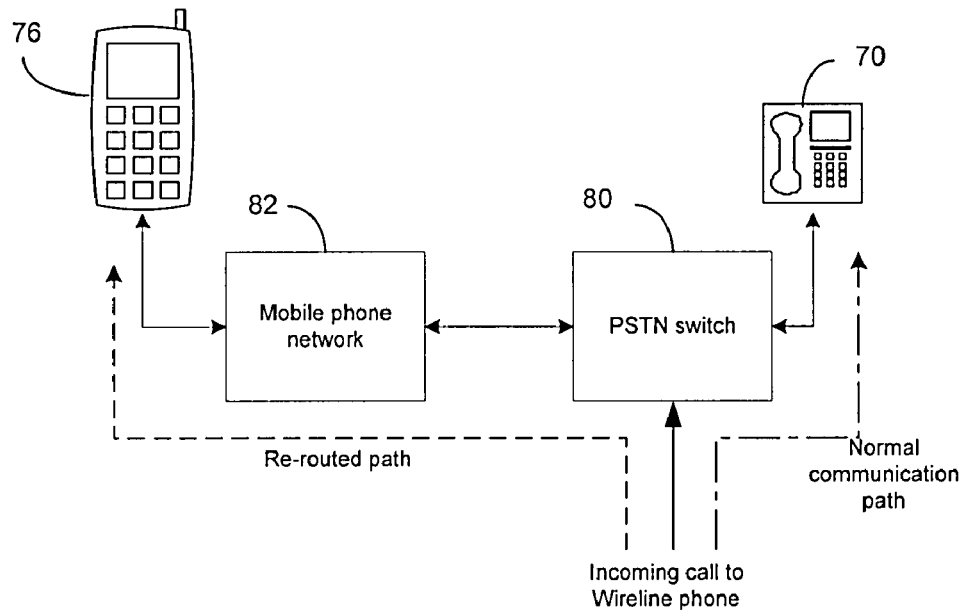
FIG. 5 is a schematic diagram illustrating another exemplary communication rerouting operation in accordance with the invention.

FIG. 5 illustrates another exemplary implementation of a communication rerouting system, wherein the first communication device 70 is communicatively coupled to a public switched telephone network switch (PSTN) 80, and the second communication device 76 is coupled to a mobile telephone network switch 82 (e.g., a conventional wireless communication link with a mobile service provider). The PSTN switch 80 and the mobile telephone network switch 82 may exchange information as is conventional so as to provide voice and/or data communications to the respective first and second communication devices 70 and 76. In normal operation, communications intended for the first communication device 70 are accepted by the PSTN switch 80 and then routed to the first communication device 70.

If an individual wishes to receive communications intended for the first communication device 70 via the second communication device 76, he may initiate a rerouting request as described above (e.g., pressing a function key on the second communication device, which initiates the rerouting request). The request, however, instead of being sent to the computer 72, is sent to the mobile telephone network switch 82 and/or the PSTN switch 80. The request from the second communication device 76 may be in the form of a call back to the mobile telephone network switch 82 (e.g., a call to a specific number of the service provider used for rerouting requests), an SMS message to the switch 82, a message embedded in a data packet service (e.g., GPRS, EGPRS, HSTPA, CDMA, etc.) to the switch 82, or any other means available to communication devices for communicating the request to the switch 82. Once received by the mobile telephone network switch 82, the information is processed (e.g., an identifier such as a phone number specific to the second communication device 76 is included along with the rerouting request) and the processed information is forwarded to the PSTN switch 80. The PSTN switch 80 then receives and executes the rerouting request, and reroutes the communications intended for the first communication device 70 to the second communication device 76 (e.g., the PSTN switch 80 routes the call to the mobile telephone network switch 82 with the identifier (e.g., phone number) of the second communication device 76).

In a variation of the above, if the first communication device 70 is a VoIP communication device, then instead of communicating to the PSTN switch 80, the mobile telephone network switch 82 would provide the rerouting request to a VoIP server. In this example, the wire line number is an IP address for the VoIP server. Accordingly, in the exemplary system of FIG. 5, the PSTN switch 80 (or a VoIP server) and mobile telephone network switch 82 implement the communication rerouting function.

Figure 6:
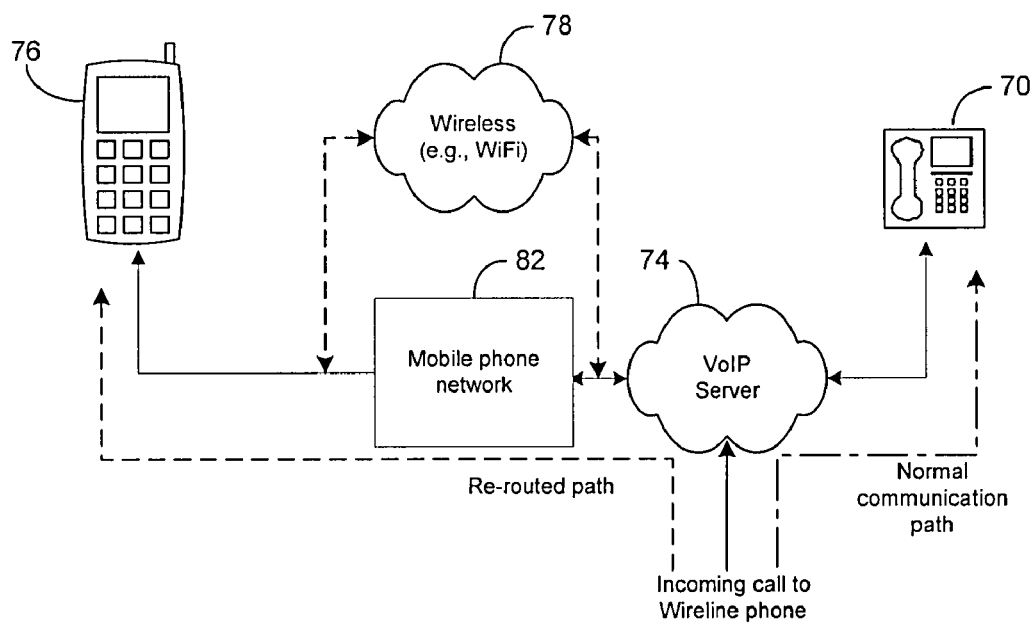
FIG. 6 is a schematic diagram illustrating yet another exemplary communication rerouting operation in accordance with the invention.

FIG. 6 shows yet another exemplary implementation of a communication rerouting system, wherein the first communication device 70 (e.g., a VoIP wire line phone) is communicatively coupled to VoIP server 74 (e.g., via a DSL or cable modem (not shown) coupled to the internet), and the second communication device 76 also is communicatively coupled to the VoIP server 74 (e.g., via an internet connection provided by the mobile phone switch 82 or via a WiFi connection 78 to the VoIP server 74). In normal operation, communications intended for the first communication device 70 (which are identified using an IP address) are accepted by the VoIP server 74 and then routed to the first communication device 70. If an individual wishes to receive communications intended for the first communication device 70 via the second communication device 76, he may initiate a rerouting request as described above.

In FIG. 6, the rerouting request can be initially sent to the mobile telephone network switch 82 (e.g., via a call to a specific number, an SMS message, etc.), which can process the request as discussed above (e.g., the mobile telephone network switch 82 includes an identifier for the second communication device 76 and then sends the request to the VoIP server 74). The form of the request from the mobile telephone network switch 82 to the VoIP server 74 may be in the form of a SIP script or the like that may be executed by the VoIP server 74. The VoIP server 74 executes the script so as to reroute the communication to the second communication device 76. For example, the VoIP server 74, instead of providing the communication to the first communication device 70, may provide the mobile telephone network switch 82 with the communication along with an identifier (e.g., a telephone number or IP address of the second communication device 76 as provided in the request) and then the mobile telephone network switch 82, via conventional mobile communication channels or via VoIP based channels, routes the communication to the second communication device 76.

Alternatively, the second communication device 76 may be communicatively coupled to the VoIP server 74 via the WiFi connection 78. In this scenario, the rerouting request may be processed by the second communication device 76 and communicated directly to the VoIP server 74. The request may be in the form of a SIP script, wherein the request includes an IP address of the second communication device 76. The VoIP server 74, based on the IP address provided in the SIP script, sends the communication to the second communication device 76 as a VoIP based communication. Accordingly, in the exemplary system of FIG. 6, the VoIP server 74 and/or the mobile telephone network switch 82 implement the communication rerouting function.

Figure 7:
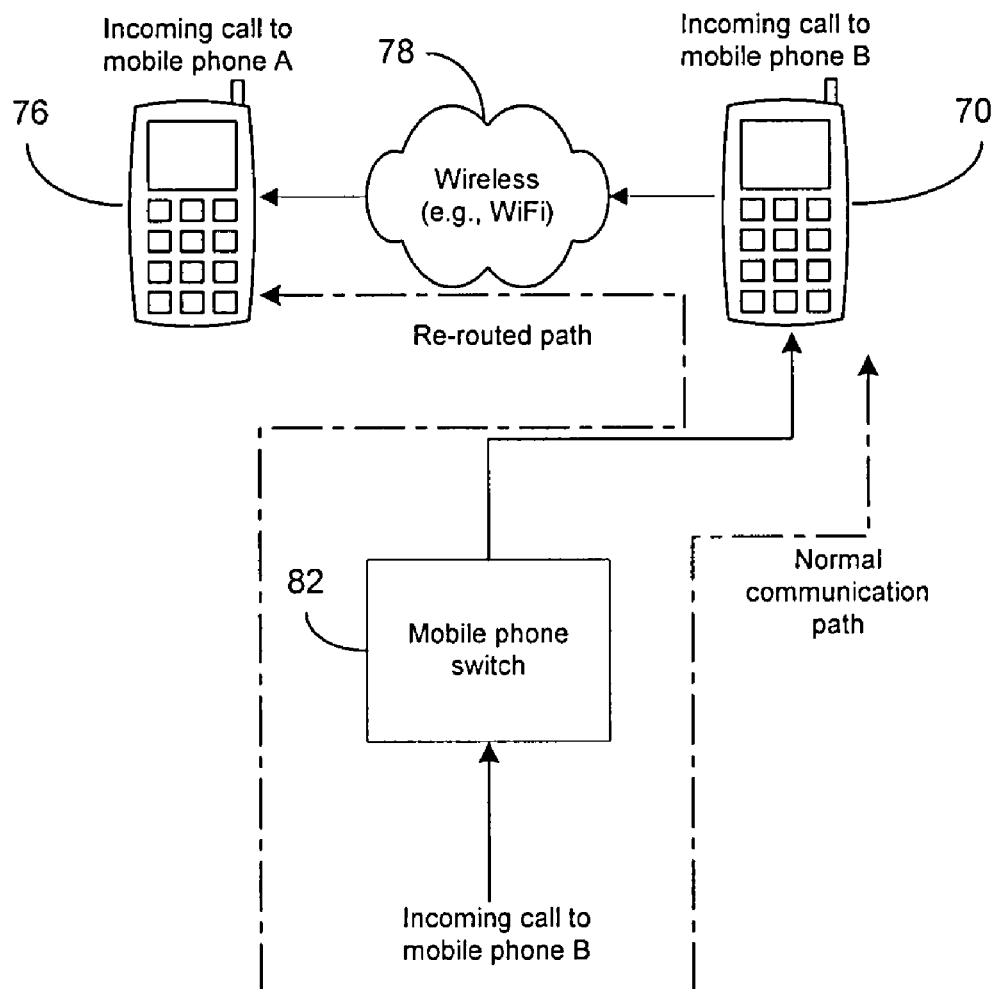
FIG. 7 is a schematic diagram illustrating another exemplary communication rerouting operation in accordance with the invention.

FIG. 7 shows yet another exemplary implementation of a communication rerouting system. In the example of FIG. 7, the first communication device 70 and the second communication device 76 both are mobile telephones (e.g., a work mobile phone and a personal mobile phone), each of which may be communicatively coupled to the mobile telephone network switch 82. Further, each communication device 70 and 76 includes a wireless interface (e.g., a WiFi interface or a Bluetooth or other short range interface), which enables the first and second communications devices 70 and 76 to establish a WiFi connection 78 or the like so as to exchange communication data.

In normal operation, communications intended for the first communication device 70 are accepted by the mobile telephone network switch 82 and then routed to the first communication device 70, and communications intended for the second communication device 76 are accepted by the mobile telephone network switch 82 and then routed to the second communication device 76, as is conventional. If an individual wishes to receive the communications intended for one communication device on the other communication device (e.g., accept a communication intended for the first communication device 70 via the second communication device 76), he may initiate a rerouting request as described above (e.g., via function key or the like). Assuming the second communication device 76 will be used to receive a communication intended for the first communication device 70, the rerouting request, which may include a SIP script or the like, may be sent from the second communication device 76 directly to the first communication device 70 via the WiFi connection 78. The first communication device 70 may execute the script and in response, the first communication device 70 sends the communication data intended for the first communication device 70 to the second communication device 76, and the second communication device 76 sends communication data received via its microphone, keypad, or other input means back to the first communication device 70 (which then sends the data to the mobile telephone network switch 82). In other words, the second communication device 76 acts as a headset for the first communication device, while the first communication device handles communications with the mobile telephone network switch 82. Further, the communication data may be sent as streaming data via the WiFi connection 78.

Alternatively, the first and second communications devices 70 and 76 may be configured as cluster, such that they automatically communicate events between each other via WiFi connection 78. In other words, the individual need not manually initiate the rerouting request. Instead, notification of an event may be automatically sent (e.g., via WiFi) from the first communication device 70 to the second communication device 76 (and vice versa), and the individual may simply pick up the second communication device 76 to receive communications directed to the first communication device 70.

If the communication devices 70 and 76 are not within range of one another when an event occurs (e.g., an incoming call), notification of the event may be provided at a later time (e.g., when the two devices are again within range of one another). For example, if an incoming call is made on the first communication device 70 and the second communication device 76 is not within range of the first communication device at the time of the call, then when the two communication devices 70 and 76 are again within range of one another, a "missed call" event may be transmitted from the first communication device 70 to the second communication device 76. In this manner, the user may be notified of the missed call on the first communication device 70.

Other than the automatic communication of events, operation of the communication devices 70 and 76 as a cluster is substantially the same as manual operation (i.e., one communication device acts as a head set for the other communication device, and data may be exchanged between the respective communication devices via a streaming connection, or other format).

The above noted events may include, for example, notification of an incoming communication, such as a call, missed call, email, text message, etc. Further, the event and/or notification may include or otherwise trigger an audible and/or visual alert that is provided on the first and/or second communication device 70 and 76. As will be appreciated, different audible and/or visual alerts may be utilized for different types of events (e.g., a first ring tone for voice communications intended for the first communication device 70, a second ring tone for voice communications intended for the second communication device 76, a third ring tone for text messages intended for the first communication device 70, etc.). Further, the communication can be either Circuit Switched Voice or data, including VoIP data, but also SMS, email and/or Instant Messaging.

For example, communications may be received by the first communication device 70 as is conventional. Then, upon receiving the rerouting request, the first communication device 70 streams the received communications to the second communications device 76 via the WiFi connection 78. Similarly, communications input into the second communication device 76 (e.g., data obtained from the second communication device's input means, such as the microphone, keypad, etc.) may be streamed back to the first communication device

70. The first communication device 70 then can provide the communications received from the second communication device 76 to the mobile phone switch 82. Thus, the first communication device 70 effectively acts as a bridge between the second communication device 76 and the mobile phone network 82. The configuration of FIG. 7 is advantageous, for example, in that it enables the individual to place one of the communication devices (e.g., the first communication device 70) in an easy to carry and out of the way location (e.g., in a bag, purse, etc.), while carrying the second communication device 76 in a readily accessible location (e.g., on a belt clip). Even though the first communication device 70 is not necessarily readily accessible, voice communications directed to it can be easily received.

The rerouting function may be implemented in both communication devices. Preferably, the communication device for which the communication is intended becomes a bridge for the communication device for which the communication was not intended. For example, if a communication is intended for the first communication device 70, the first communication device acts as the bridge between the second communication device 76 and the mobile telephone network switch 82 (assuming the communication is answered on the second communication device 76). If a communication is intended for the second communication device 76, then the second communication device 76 acts as a bridge between the first communication device 70 and the mobile telephone network switch 82 (assuming the communication is answered on the first communication device 70). Accordingly, in the example of FIG. 7, the rerouting function is implemented by the first and/or second communication devices 70 and 76.

Figure 8:
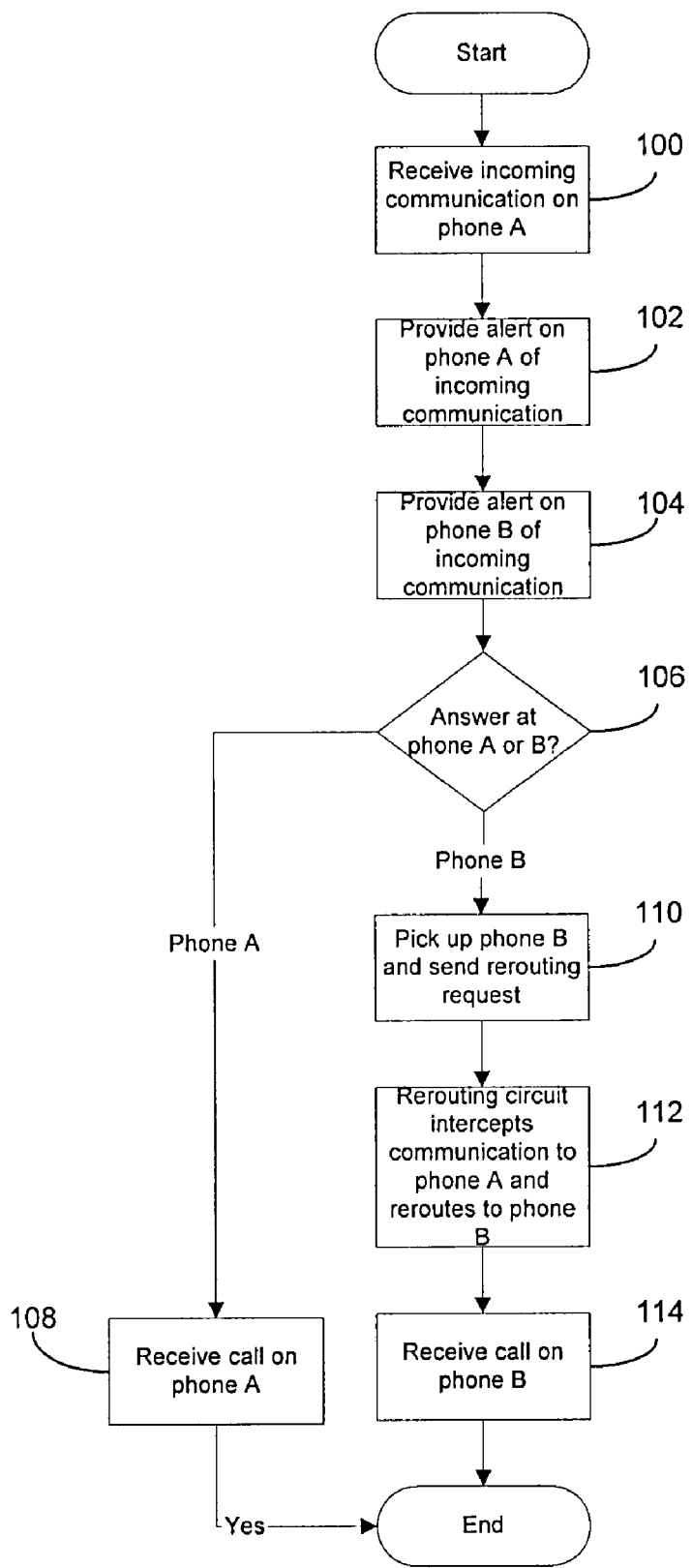
FIG. 8 is a flow chart of an exemplary communication rerouting method in accordance with the present invention.

Referring now to FIG. 8, an exemplary method of providing call rerouting for a user of electronic equipment is depicted. The exemplary method of FIG. 8 describes the steps that may be executed in rerouting a voice communication from the electronic equipment to other communication devices. Further, while the message rerouting function 22 is described as residing primarily on the mobile telephone 10, portions may reside in other locations. For example, portions of the message rerouting function 22 may reside on the server 58 (e.g., within the message rerouting support function 60), on another PC (not shown) or on other communication devices. The functionality of the method may be embodied as executable code, such as in the form of the message rerouting function 22 and/or the message rerouting support function 60, or any other suitable form, including software, firmware, dedicated circuit components, a program stored on a computer readable media or in machine usable medium, and so forth.

Although the illustrated method shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

Beginning with block 100 of FIG. 8, an incoming communication is received at a first communication device (e.g., a wire line telephone, electronic equipment embodied as a mobile telephone, etc.). For example, a call, text message, email, etc. may be made or otherwise sent to the first communication device. At block 102, the first communication device may provide some local indication of the incoming communication. For example, the first communication device may provide an audible signal (e.g., a ring tone or the like) to alert the user of the incoming communication.

At block 104, the first communication device may optionally provide a notification of the incoming communication to a second communication device (e.g., another wire line phone, electronic equipment etc.). This notification may be provided to the individual as an alert (e.g., a ringing, vibration, etc. on the second communication device).

At block 106, the individual decides whether to answer the communication via the first communication device or the second communication device. If the individual chooses to answer the communication on the first communication device, then at step 108, the communication is answered and the method ends.

If the individual chooses to answer the communication at the second communication device, then at block 110, a rerouting request is transmitted from the second communication device to a rerouting circuit. The rerouting circuit may reside in the first communication device, or it may reside elsewhere, such as within a wire line phone network switch, a VoIP phone network, a personal computer, and/or a mobile telephone network switch.

The rerouting request may be manually initiated (e.g., via manual activation of a function key or the like on the second communication device) or automatically initiated (e.g., multiple communication devices are configured as a cluster), wherein the communication device receiving the communication automatically notifies the other communication devices of the incoming message. The rerouting request can include identification information (e.g., a phone number, IP address, etc.) that uniquely identifies the communication device making the rerouting request. The identification information enables the rerouting circuit to route the communication to the appropriate communication device.

At block 112, the rerouting circuit intercepts the communication intended for the first communication device and, using the identification information from the rerouting request, reroutes the communication to the second communication device. Rerouting may be implemented using a WiFi connection between the first and second communication devices, wherein the communication is streamed between the communication devices. Alternatively, rerouting may be implemented via the wire line network switch, mobile telephone network switch, VoIP server, or the like. At block 114, the communication may be answered at the second communication device.

Specific embodiments of the invention have been disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

Computer program elements of the invention may be embodied in hardware and/or in software (including firmware, resident software, micro-code, etc.). The invention may take the form of a computer program product, which can be embodied by a computer-usable or computer-readable storage medium having computer-usable or computer-readable program instructions, "code" or a "computer program" embodied in the medium for use by or in connection with the instruction execution system. In the context of this document, a computer-usable or computer-readable medium may be any medium that can contain, store, communicate, propagate, or transport the program for use by or in connection with the instruction execution system, apparatus, or device. The computer-usable or computer-readable medium may be, for example but not limited to, an electronic, magnetic, optical, electromagnetic, infrared, or semiconductor system, apparatus, device, or propagation medium such as the Internet. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner. The computer program product and any software and hardware described herein form the various means for carrying out the functions of the invention in the example embodiments.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A method for rerouting a communication from a first communication device to a second communication device, comprising:
    upon receiving the communication intended for the first communication device, the second communication device requesting to a rerouting circuit that the communication intended for the first communication device be rerouted to the second communication device; and
    based on said request, rerouting the communication intended for the first communication device to the second communication device, said rerouting including providing the communication with a new routing table extension corresponding to the second communication device,
    wherein said rerouting further comprises establishing a direct communication link between the first and second communication devices, and using the direct communication link to reroute the communication intended for the first communication device to the second communication device.

2. The method of claim 1, further comprising implementing the rerouting circuit in at least one of the first or second communication device, or in a network server that provides communications to the first and/or second communication device, said rerouting circuit operative to coordinate communications to the first and second communication devices.

3. The method of claim 1, wherein the second communication device requesting to the rerouting circuit that the communication intended for the first communication device be rerouted includes using at least one of a short range wireless connection, a PSTN connection, a mobile telephone network connection, or a VoIP connection as the medium for sending the request.

4. The method of claim 3, wherein using the short range wireless connection further includes using a computer that is communicatively coupled to the first and/or second communication device via the short range wireless connection.

5. The method of claim 4, wherein the first communication device is a VoIP telephone communicatively coupled to the computer, further comprising using the computer to establish communications with a VoIP server so as to provide VoIP communications.

6. The method of claim 1, wherein establishing a direct communication link includes communicating events between the first and second communication devices.

7. The method of claim 6, wherein the events include at least one of notification of an incoming communication or notification of a missed communication.

8. The method of claim 1, wherein establishing a direct communication link includes establishing a direct communication link via a short range wireless connection.

9. The method of claim 1, wherein rerouting the communication intended for the first communication device to the second communication device includes streaming the communication between the first and second communication devices.

10. The method of claim 1, wherein the communication is at least one of a voice communication, a text message or an email.

11. The method of claim 1, wherein the first communication device is a mobile telephone, and the second communication device is a mobile telephone or a wire line telephone.

12. The method of claim 1, wherein the first and second communication devices are electronic equipment.

13. An electronic device operative to establish communications with a communication device, comprising:
    call circuitry operative to establish a communication link over a communications network;
    a rerouting circuit operatively coupled to the call circuitry, said rerouting circuit operative to reroute via the call circuitry a first communication intended for the electronic device to the communication device, wherein the rerouting circuit provides the first communication with a new routing table extension corresponding to the communication device; and
    a short range wireless communication interface operatively coupled to said rerouting circuit,
    wherein the rerouting circuit is operative to stream the first communication to the communication device via the short range wireless communication interface.

14. The electronic device of claim 13, wherein the rerouting circuit is further operative to receive a second communication intended for the communication device, said second communication being rerouted to the electronic device.

15. The electronic device of claim 13, wherein the rerouting circuit is operative to notify the communication device of events.

16. The electronic device of claim 15, wherein the events include notification of an incoming communication and/or notification of a missed communication.

17. The electronic device of claim 13, wherein the electronic device is a mobile telephone.

18. The electronic device of claim 13, wherein the rerouting circuit is operative to automatically notify the communication device of the communication.

* * * * *